Aug. 13, 1968     R. S. ALM     3,397,025
ADJUSTABLE LIGHT APERTURE, PARTICULARLY A SLIT IN
A DIAPHRAGM IN AN OPTICAL SYSTEM
Filed June 26, 1964
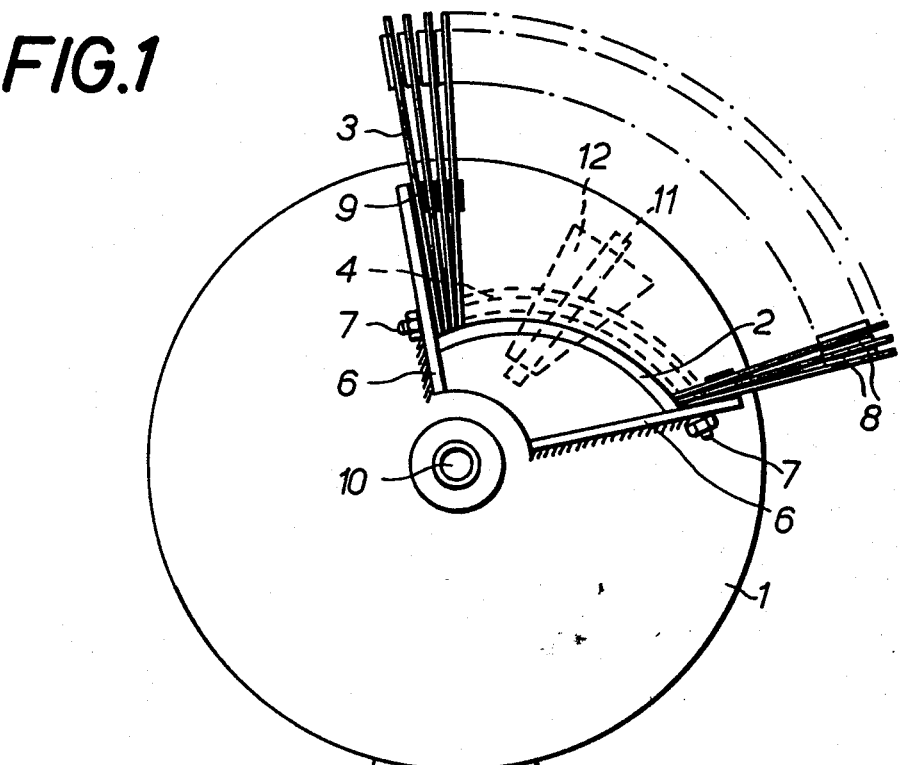
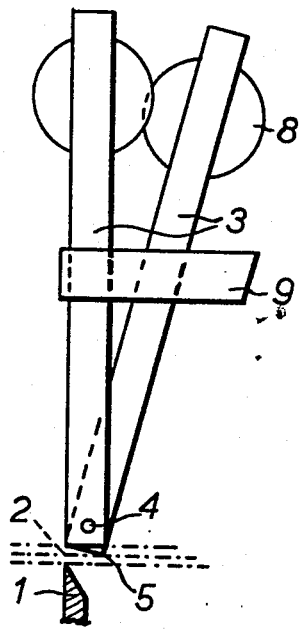
INVENTOR
RASMUS STRANDE ALM
BY *Irwin S. Thompson*
ATTORNEY 3,397,025
ADJUSTABLE LIGHT APERTURE, PARTICULARLY A SLIT IN A DIAPHRAGM IN AN OPTICAL SYSTEM
Rasmus Strande Alm, 74 Eiksveien, Baerum, Norway
Filed June 26, 1964, Ser. No. 378,299
Claims priority, application Norway, July 6, 1963, 149,310
4 Claims. (Cl. 350—271)

ABSTRACT OF THE DISCLOSURE

An adjustable light aperture, in particular a slit in a diaphragm in an optical system, in which at least one longitudinal edge of the slit is formed by one end of each element in a stack of elements which are independently pivotable about a common axle disposed parallel to and near the slit, the width of the slit thus being determined by the edge-forming ends through the angular position of the individual elements.

---

This invention refers to an adjustable light aperture, particularly a slit in a diaphragm in an optical system, and wherein scanning takes place with a moving light-beam, as, for example, in analytical centrifuging and spectrophotometry, and for the generation of arbitrary functions.

On account of the heterogeneity of the light field, varying spectral sensitivity of photo cells, etc., such optical systems require compensating devices to achieve satisfactory reference values.

The object of the invention therefore, is to furnish an adjustable slit which, in a simple manner, makes such compensation possible, and also allows for adjustments of reference values of any given size.

This is achieved, according to the invention, by at least one of the longitudinal borders of the slit being formed by a stack of elements, each one independently pivotable about an axle that extends parallel to and near the slit. This allows the local width of the slit to be controlled with great accuracy, inasmuch as that part of the end of the flat element which borders the slit can consist of a sharp corner edge.

In order to even out the individual borders of the slit formed by the elements the end surfaces of the elements bordering the slit may be joined with some suitable covering to form a bridge.

An example of this invention will be explained in more detail with reference to the drawing.

FIGURE 1 is a sketch showing a diaphragm with an adjustable slit according to the invention, for use with an analytical centrifuge in which use is made of a scanning light beam.

FIGURE 2 shows, on an enlarged scale, a radial section of FIGURE 1.

A stationary diaphragm 1 has a curved slit 2, of which one border is adjustable by means of a number of flat elements 3, which may be rotated on an axle 4, which runs roughly parallel to the slit. The end part of the flat element which borders the slit 2 is, in this example, shown as a corner edge 5, but any other suitable shape could have been chosen. The axle 4 is fitted between two stationary supporting members 6, on the diaphragm 1, and held in place with the help of nuts 7. Each of the flat elements 3, at the end opposite to that controlling the slit, carries a round disc 8, in order that they may exert a controlling influence on one another during the adjustment movement. About the middle, the elements are further controlled by means of a laminated member 9, built up of distance pieces.

In order to produce the scanning light beam, behind the diaphragm 1, seen in the direction towards the plane of the drawing, there is a rotatable diaphragm or shutter (not shown in the drawing) fitted to the axle 10, having a radial slit 11, which operates in cooperation with the stationary, adjustable slit 2. A beam from a light source (not shown), emitting light at right-angles to the plane of the drawing, penetrates the slit 2 in the stationary diaphragm 1, and slit 11 in the rotating diaphragm or shutter, and will, in the form of a moving beam, penetrate a rotating centrifuge container 12—indicated by dotted lines over the slit 11—in a centrifuge rotating about axis 10. The beam is collected by a lens and focused onto a photo-cell which controls an amplifier, or a photo-multiplier, to control the vertical deflection in a cathode-ray oscilloscope, of which the horizontal deflection is controlled synchronously with the rotation of the slit 11, and the centrifuge's container 12.

The slit construction described can also be used in connection with a spectrophotometer, in which case the curve of the slit 2 should preferably be described about axis 10, and the light from the light source being split through, for example, a prism. In this manner, the beam will change its wave-length during its motion.

I claim:
1. An adjustable light aperture, comprising means defining a slit, an axle in unitary assembly with said means and extending along and near the slit, and a stack of elements individually pivotally supported on said axle, each of said elements having portions that extend over the slit different distances from the axle, so that upon rotation of said elements, said portions extend over the slit a distance that varies according to the rotated position of the elements thereby adjustably to determine the width of the slit.

2. An adjustable aperture as claimed in claim 1, said portions of said elements including a corner edge.

3. An adjustable aperture as claimed in claim 1, each of said elements being elongated and mounted on said common axle adjacent one end of the element.

4. An adjustable aperture as claimed in claim 1, said slit and said axle being arcuate and said elements lying in planes that are disposed at small acute angles to each other.

References Cited
UNITED STATES PATENTS 2,681,509  6/1954  Elkins _____ 88—14
3,301,124  1/1967  Amery _____ 88—14

JEWELL H. PEDERSEN, *Primary Examiner.*
W. L. SIKES, *Assistant Examiner.*